Figure 1:
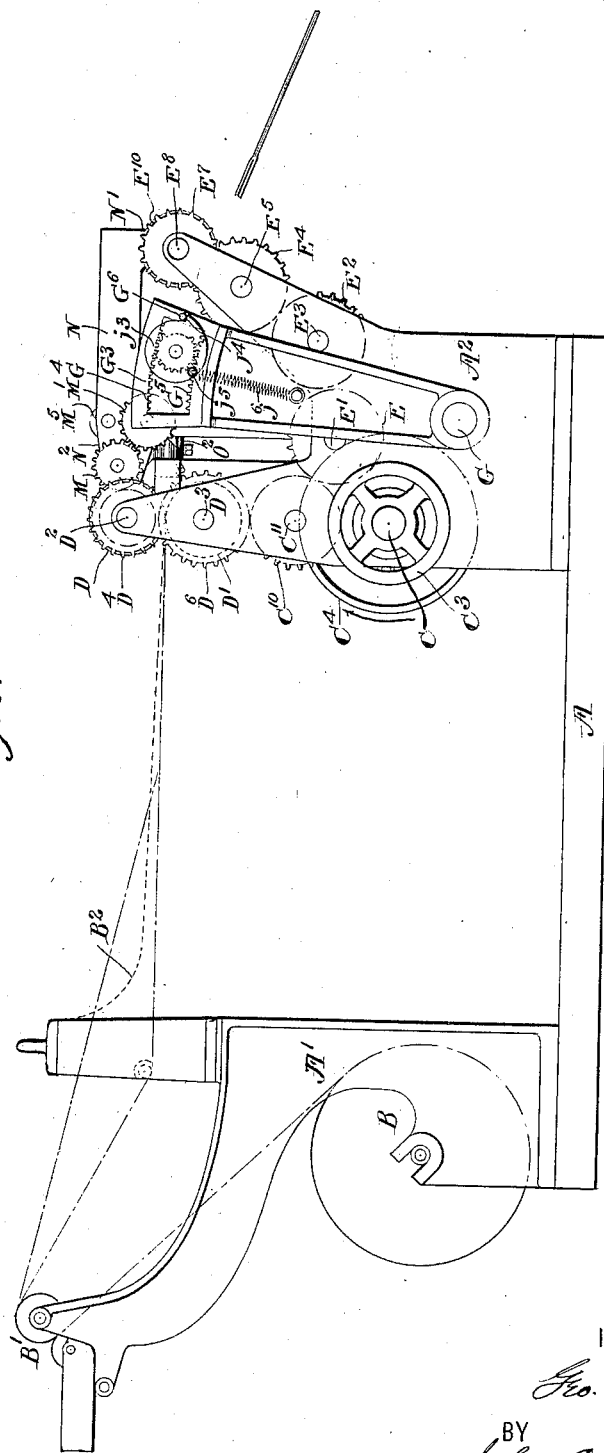

No. 744,948. PATENTED NOV. 24, 1903.
G. R. WARD.
PAPER BAG MACHINE.
APPLICATION FILED AUG. 14, 1900.
NO MODEL. 10 SHEETS—SHEET 1.

WITNESSES:

INVENTOR
Geo. R. Ward.
BY
ATTORNEY

No. 744,948. PATENTED NOV. 24, 1903.
G. R. WARD.
PAPER BAG MACHINE.
APPLICATION FILED AUG. 14, 1900.
NO MODEL. 10 SHEETS—SHEET 3.

WITNESSES: INVENTOR
Geo. R. Ward.
BY
ATTORNEY

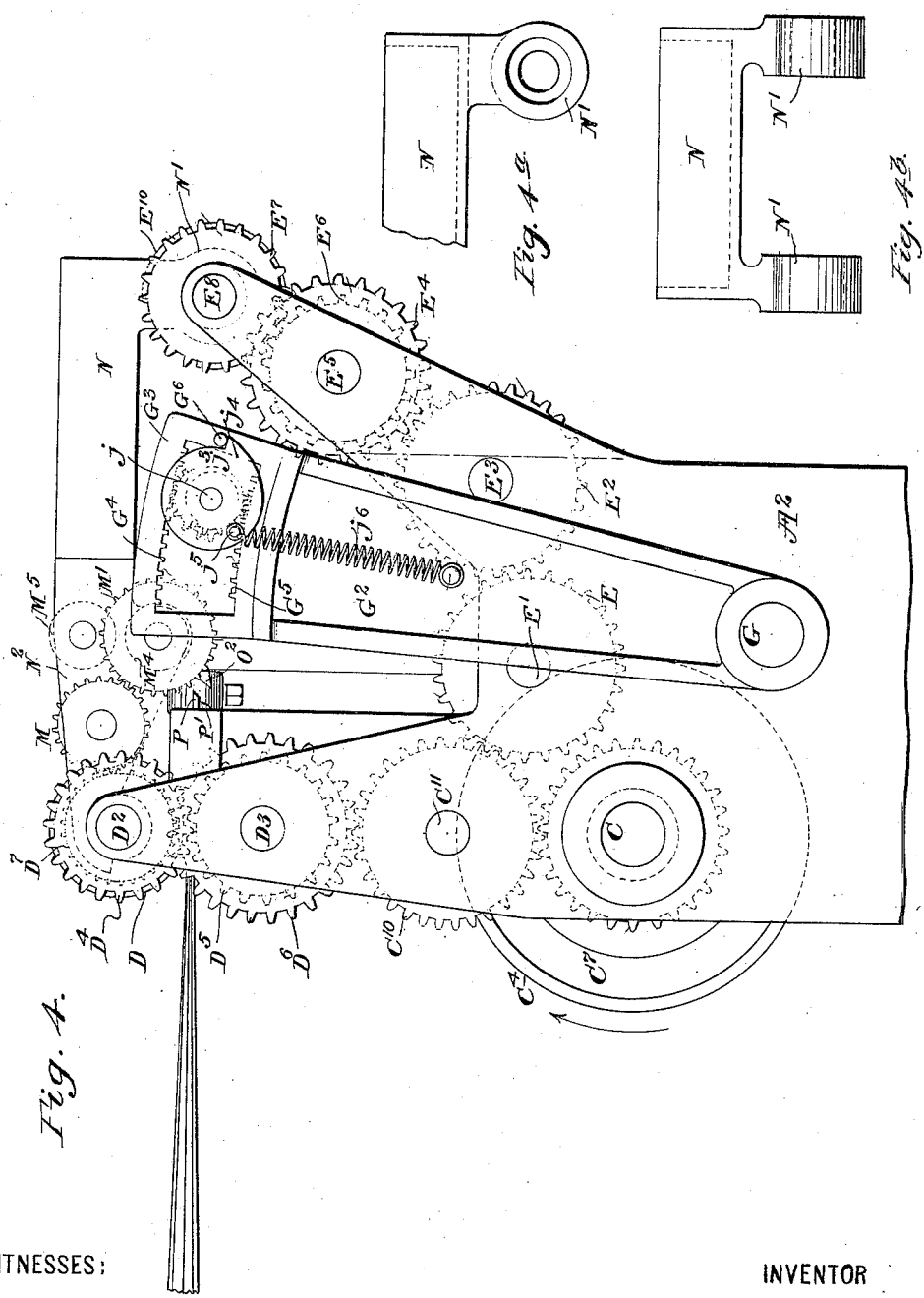

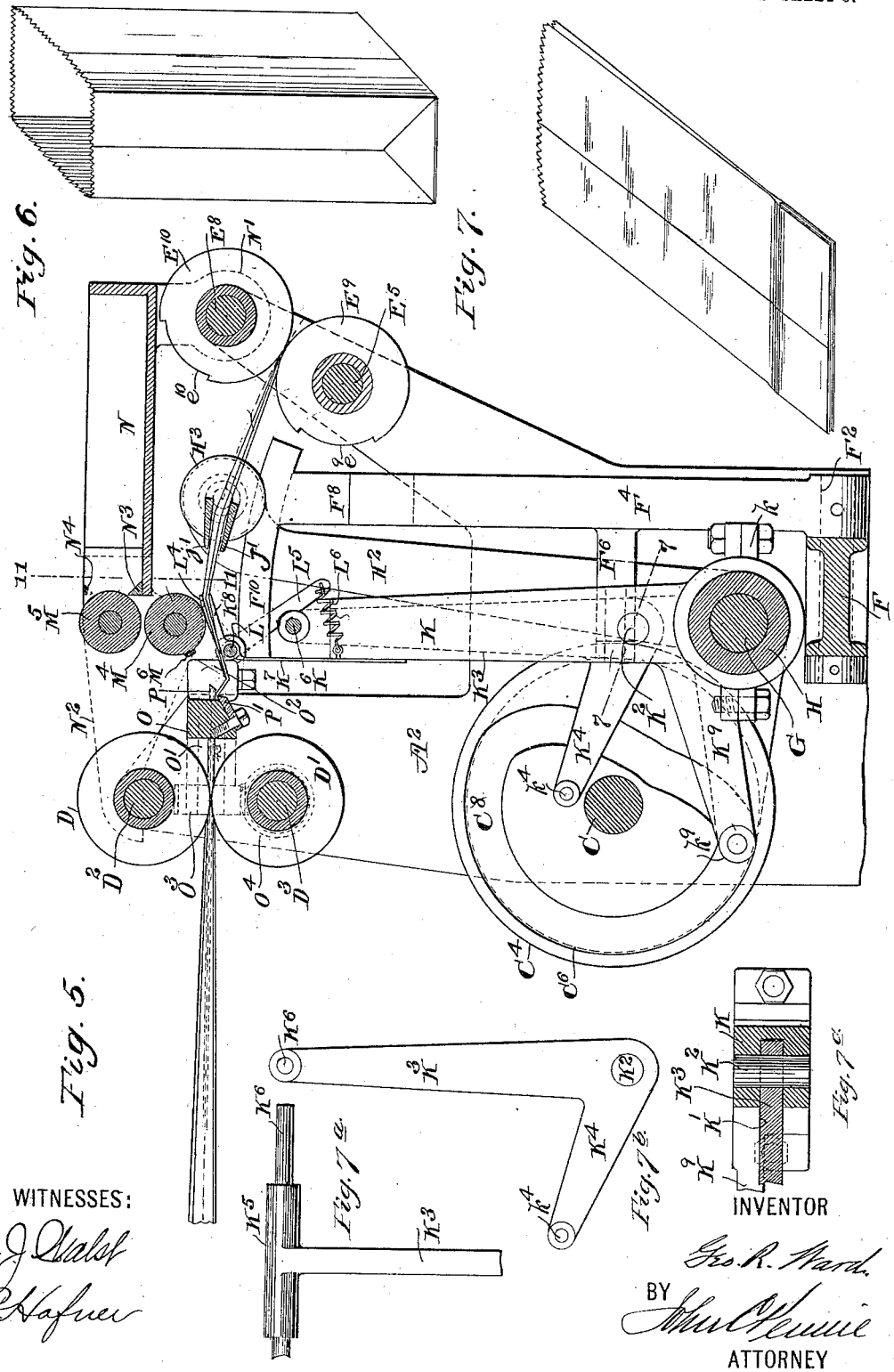

No. 744,948. PATENTED NOV. 24, 1903.
G. R. WARD.
PAPER BAG MACHINE.
APPLICATION FILED AUG. 14, 1900.
NO MODEL. 10 SHEETS—SHEET 6.
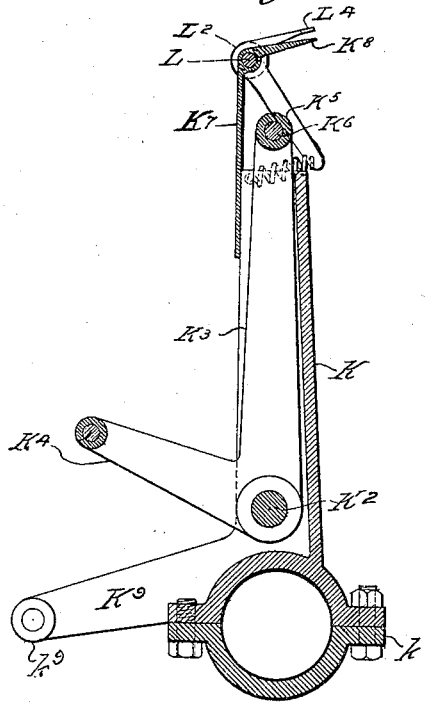
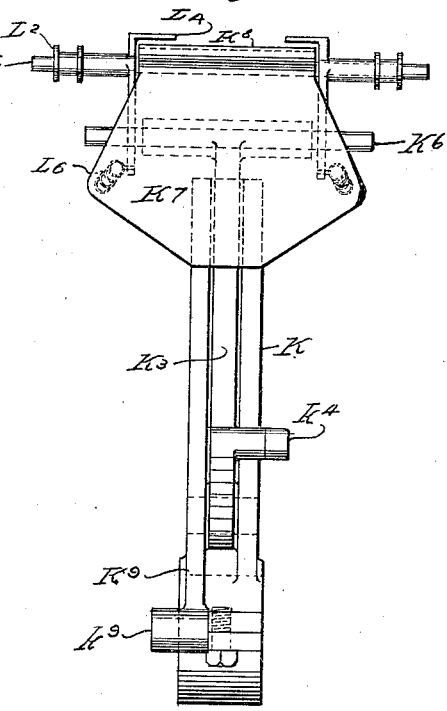

No. 744,948. PATENTED NOV. 24, 1903.
G. R. WARD.
PAPER BAG MACHINE.
APPLICATION FILED AUG. 14, 1900.
NO MODEL. 10 SHEETS—SHEET 8.

WITNESSES: INVENTOR
Geo. R. Ward.
BY
ATTORNEY.

No. 744,948. PATENTED NOV. 24, 1903.
G. R. WARD.
PAPER BAG MACHINE.
APPLICATION FILED AUG. 14, 1900.
NO MODEL. 10 SHEETS—SHEET 9.
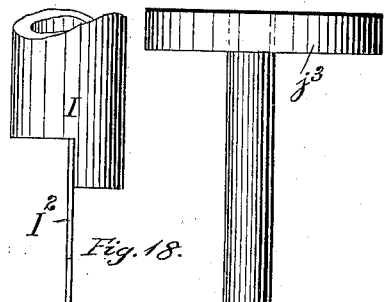
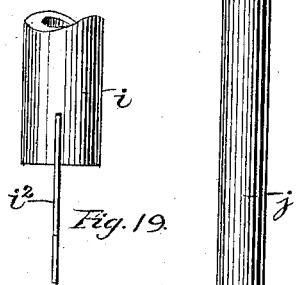
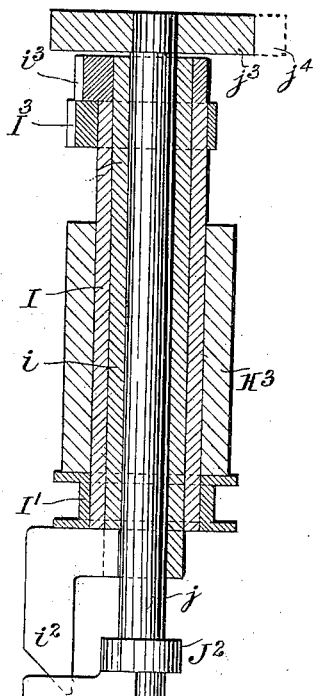
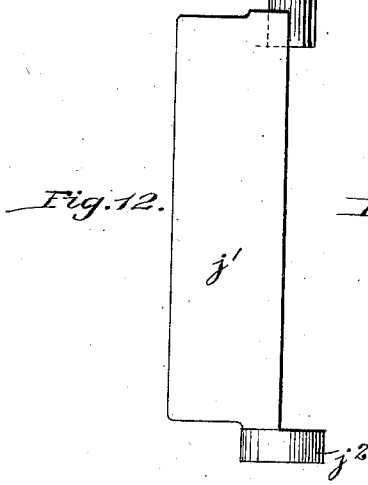
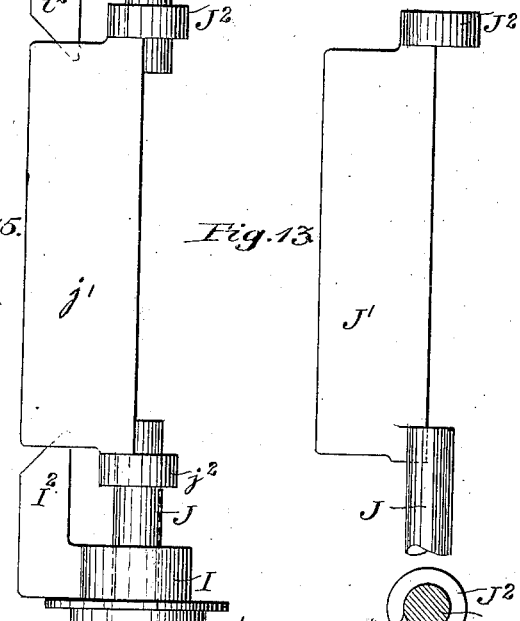
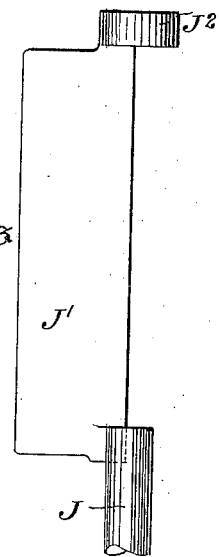
WITNESSES:
INVENTOR
ATTORNEY.

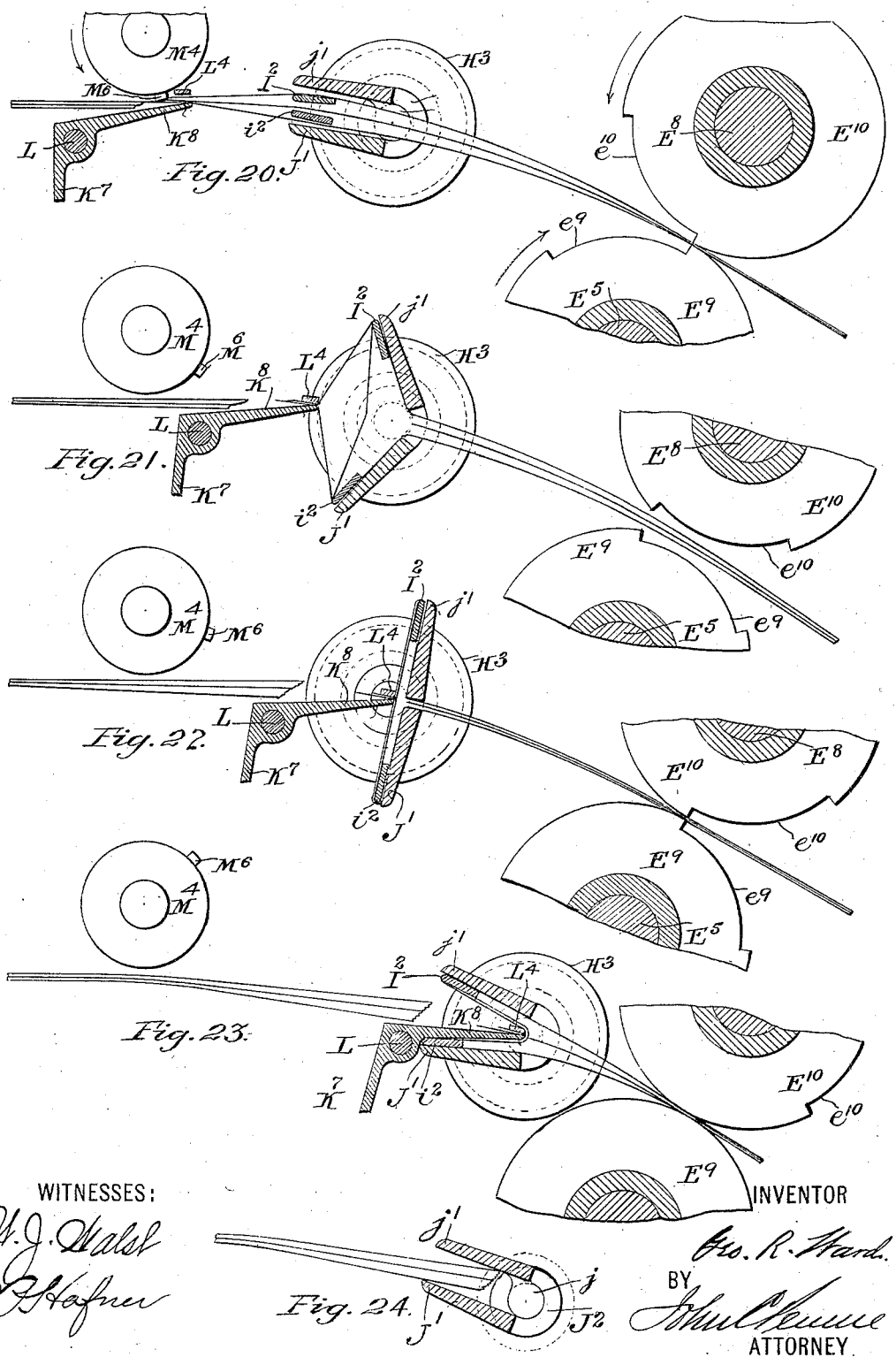

No. 744,948. Patented November 24, 1903.

UNITED STATES PATENT OFFICE.

GEORGE R. WARD, OF NEW YORK, N. Y., ASSIGNOR, BY MESNE ASSIGNMENTS, TO THE UNION PAPER BAG MACHINE COMPANY, OF PHILADELPHIA, PENNSYLVANIA, A CORPORATION OF PENNSYLVANIA.

PAPER-BAG MACHINE.

SPECIFICATION forming part of Letters Patent No. 744,948, dated November 24, 1903.

Application filed August 14, 1900. Serial No. 26,820. (No model.)

*To all whom it may concern:*

Be it known that I, GEORGE R. WARD, a citizen of the United States of America, residing in the city, county, and State of New York, have invented certain new and useful Improvements in Paper-Bag Machines, of which the following is a true and exact description, reference being had to the accompanying drawings, which form a part thereof.

My invention relates to the construction of paper-bag machines adapted to manufacture from tucked tubing bags of the general character known as "self-opening" square bags, my object being to provide a machine of novel and efficient construction for making such bags, and one especially adapted for the manufacture of bags of the general character described in the patent to Appel, No. 388,614, granted August 28, 1888.

The leading feature of my invention consists in employing two concentrically-pivoted plates or jaws having a space between them through which the body of the tucked tubular blank is inserted, and in connection with such pivoted plates or jaws concentrically-pivoted retractable gripping-fingers adapted to enter the tuck of the blank and clamp it to the outer plates or jaws, which, together with a finger, are rotated outward, so as to spread the blank into rectangular form on the plane of the bottom to be formed upon it. In connection with these distending devices I combine mechanism for folding the bottom, preferably consisting of jaws adapted to engage the end or lip of the bag and to move toward the distending plates or fingers as they open, so that when fully distended the bottom will be substantially brought to shape. By preference the distending plates and fingers after the bottom is folded to its proper position are turned backward, so as to fold the bottom over upon itself before the distending-fingers are retracted and the completed bag drawn from between the distending-plates, and in the construction shown, and which I consider the best embodiment of my invention, the distending devices, as well as the lip-clamping jaws, are mounted on swinging arms, which during the progress of their action are caused to move forward toward the delivery-rolls and to move backward to receive a fresh blank from the feed-rolls.

Other features of my invention will be best understood as described in connection with the drawings in which they are illustrated, and in which—

Figure 2:
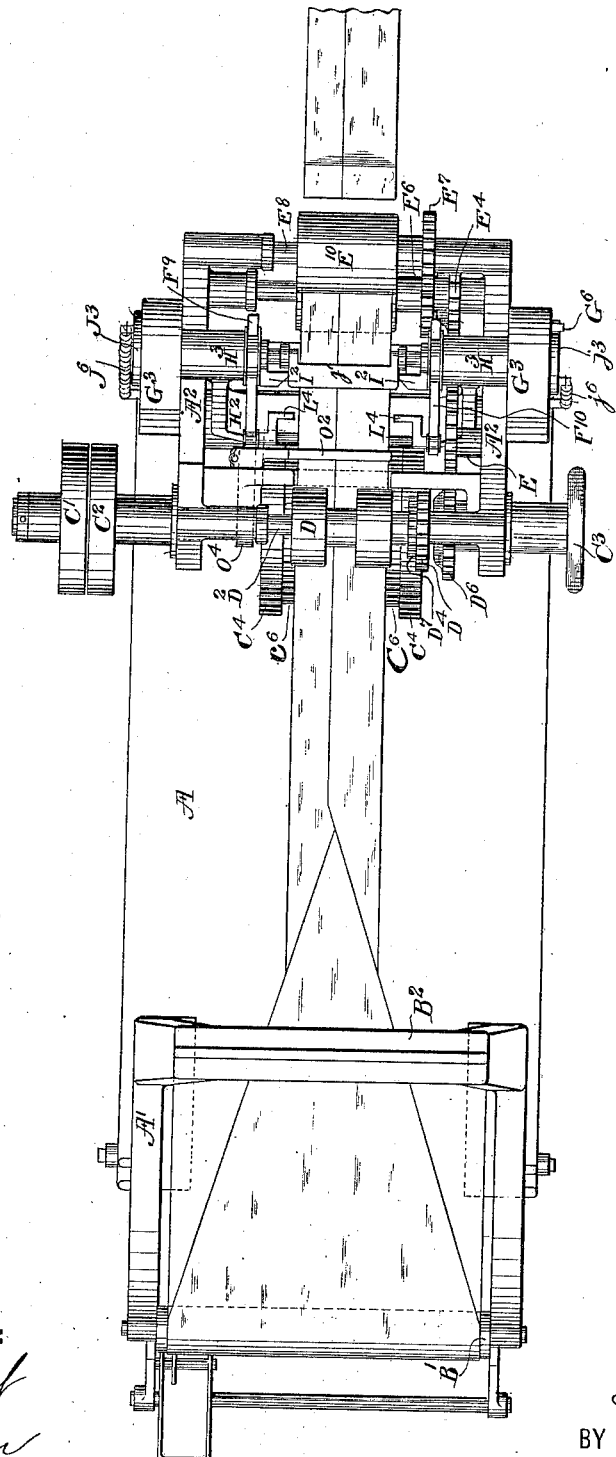
Figure 3:
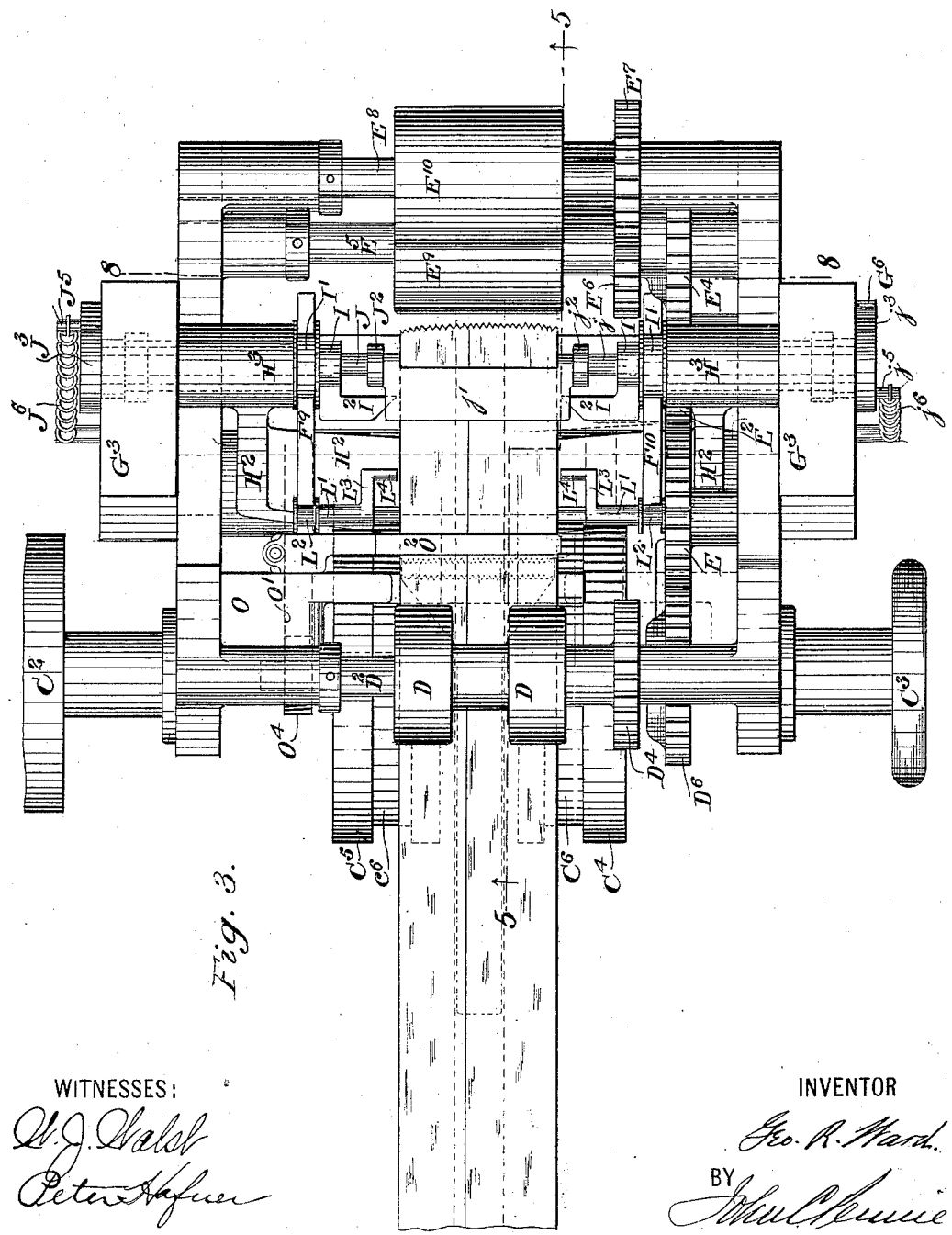
Figure 9:
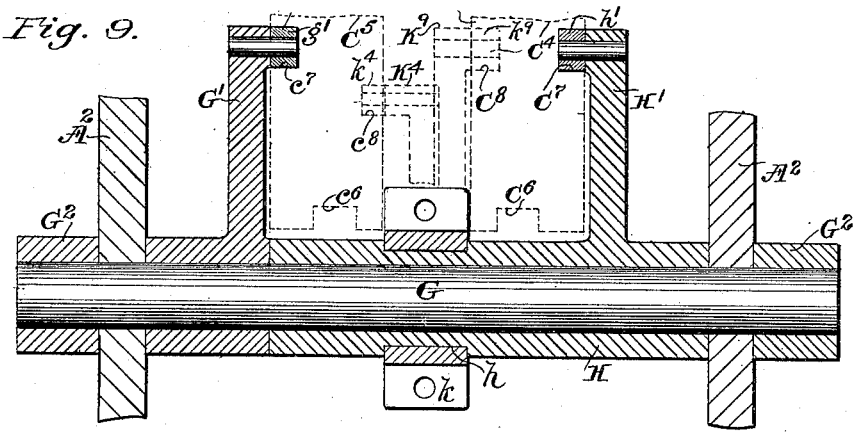
Figure 8:
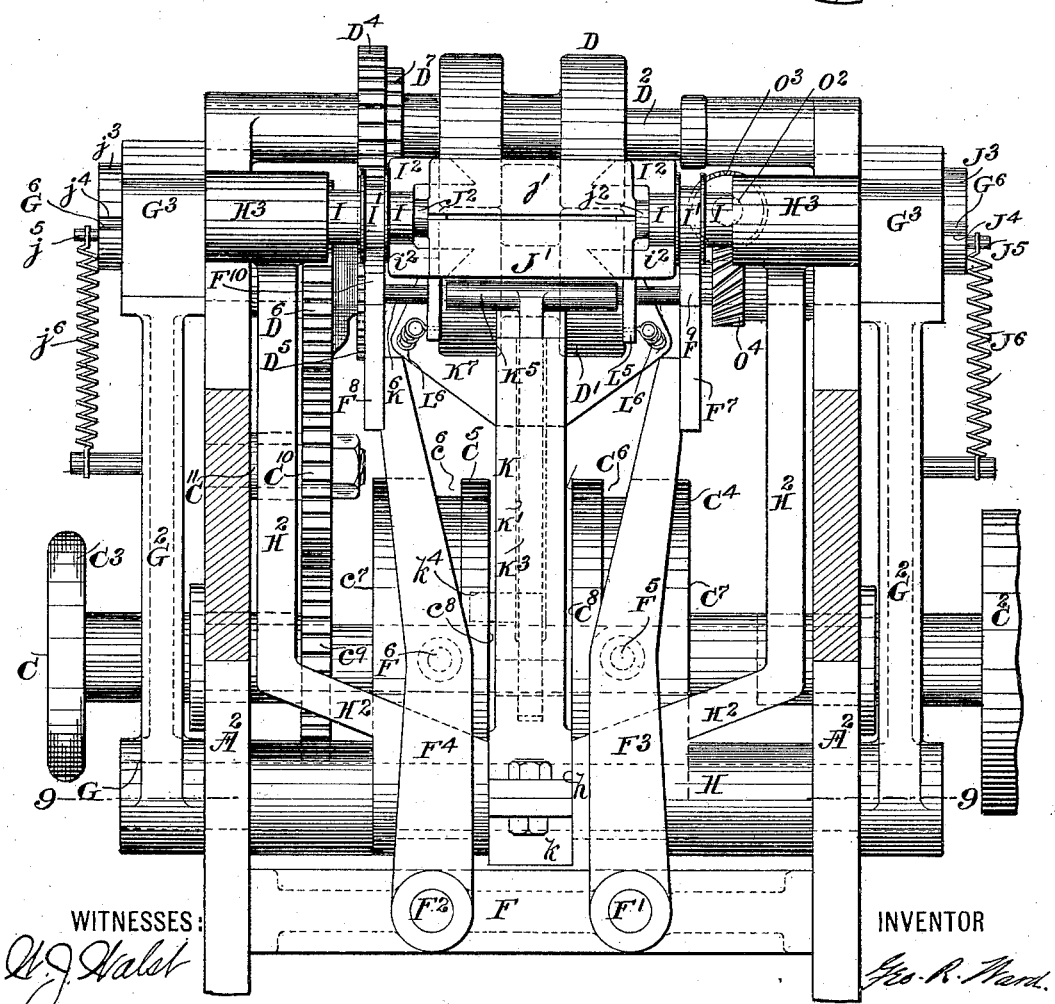
Figure 11:
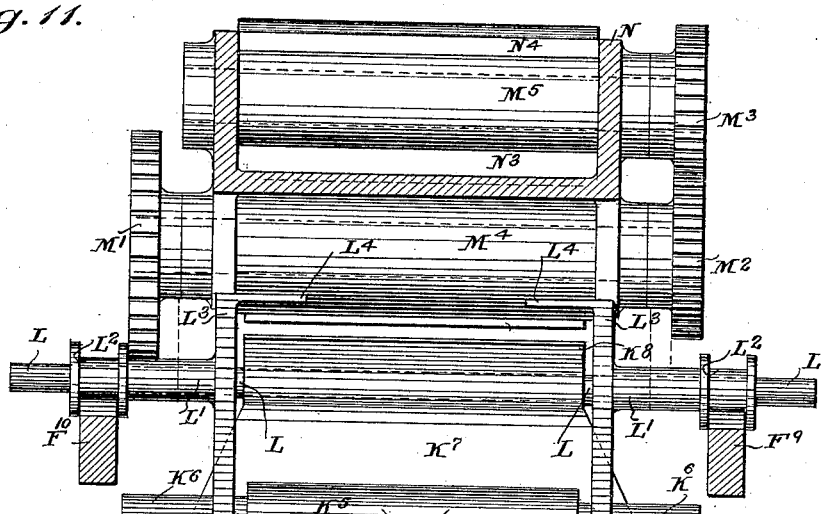
Figure 10:
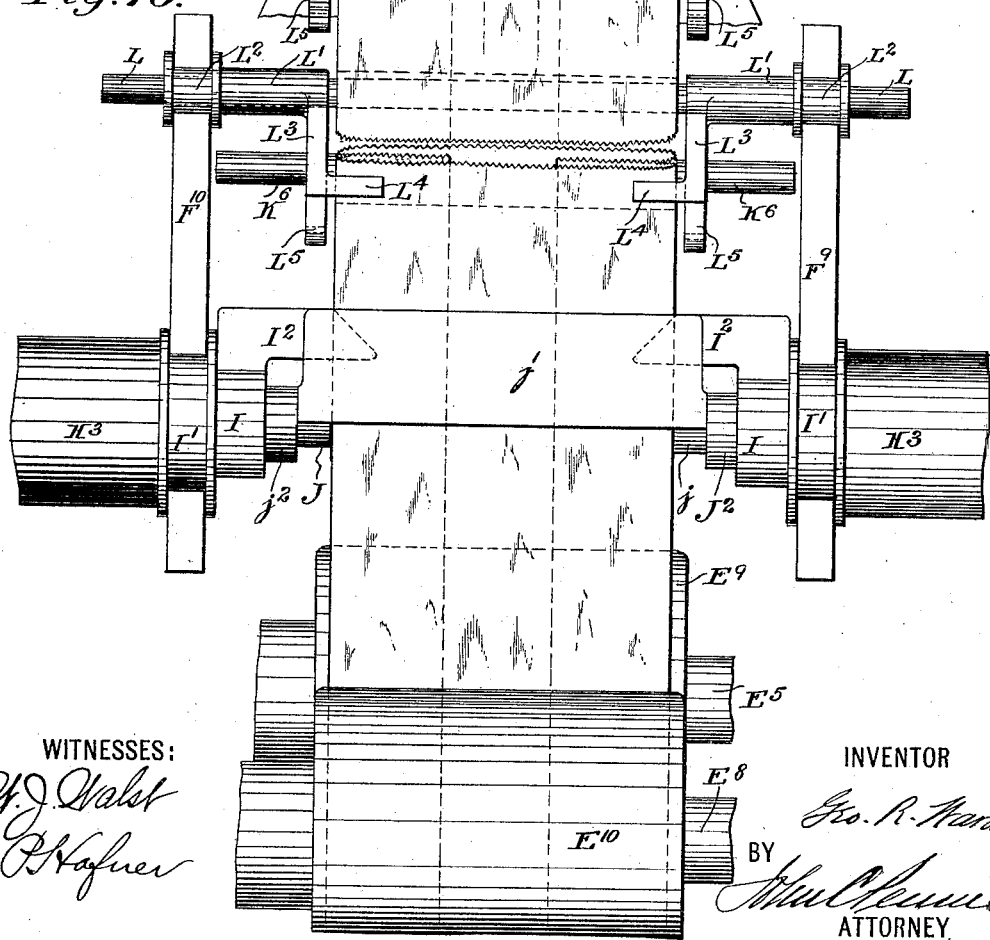

Figure 1 is a side elevation of my machine; Fig. 2, a plan view thereof; Fig. 3, a plan view on an enlarged scale; Fig. 4, a side elevation on an enlarged scale; Fig. 4$^a$, a detached side elevation of the outer end of the paste-trough; Fig. 4$^b$, an end elevation of the outer end of the paste-trough. Fig. 5 is a side elevation of the machine on the section-line 5 5 of Fig. 3. Fig. 6 is a view of the completed bag expanded; Fig. 7, a view of the completed bag as it is delivered from the machine. Fig. 7$^a$ is a detached view showing in front elevation the end of the lever K$^3$ and its attachments. Fig. 7$^b$ is a side elevation of this lever. Fig. 7$^c$ is a cross-section on the line 7 7 of Fig. 5. Fig. 7$^d$ is an enlarged sectional view of the levers K and K$^3$ and the parts immediately coacting therewith. Fig. 7$^e$ is a front elevation of the detached parts illustrated in Fig. 7$^d$. Fig. 8 is a cross-section of the machine on the line 8 8 of Fig. 3. Fig. 9 is a cross-section through the shaft G and its attachments, taken as on the line 9 9 of Fig. 8. Fig. 10 is a plan view, on a larger scale, of the distending devices shown best in Fig. 3. Fig. 11 is a cross-section, on an enlarged scale, taken as on the line 11 11 of Fig. 5. Fig. 12 is a detached plan view of one of the distending-plates and parts directly connected with it. Fig. 13 is a similar view of the other distending-plate, with the shaft to which it is attached partly cut away. Fig. 14 is an end view of the plate and attachments as shown in Fig. 13. Fig. 15 is a plan view, partly in central section, through one of the hubs H$^3$, showing the distending devices and the shafts supported in the hubs H$^3$, to which these distending devices are attached. Fig. 16 is a plan view of the upper distending-finger and the shaft to which it is attached; Fig. 17 a similar view of the lower distending-finger. Fig. 18 is a side elevation of the finger and shaft as shown in Fig. 16, and Fig. 19 a similar side elevation of the finger and shaft as shown in Fig. 17. Figs. 20 to 24, inclusive, are sectional views showing the operation of the parts acting on the blanks in the progressive formation of the bags.

A indicates the base-plate of the machine, which, as shown, supports two frames, one (indicated at A') which supports the paper-roll B, guide-rolls B', and former B$^2$, which may be of any convenient construction, the other frame (indicated at A$^2$) supporting the bottom-forming mechanism, to which my invention relates.

C is the main shaft of the machine, on which are situated the fast and loose pulleys C' C$^2$ and the hand-wheel C$^3$. Also secured on this shaft are the two cam-wheels C$^4$ and C$^5$, each having a peripheral cam-groove, as indicated at C$^6$ $c^6$, also lateral cam-grooves (indicated at C$^7$ $c^7$) on their outer sides, and, further, lateral cam-grooves (indicated at C$^8$ $c^8$) on their inner sides. Also attached to the shaft C is the gear-wheel C$^9$, which engages and drives the intermediate gear-wheel C$^{10}$ on the shaft C$^{11}$.

D and D' indicate the upper and lower feed-rolls of the machine, by means of which the tucked tubular blank is fed into it. These rolls are secured to the shafts D$^2$ and D$^3$, journaled in hubs projecting from the frame of the machine, the shafts being coupled by the gear-wheels D$^4$ D$^5$, the gear-wheel D$^5$ being situated on shaft D$^3$, to which is also secured the gear-wheel D$^6$, engaged with and driven by the intermediate gear C$^{10}$. Also driven by the intermediate gear C$^{10}$ (see Fig. 4) is the gear-wheel E, turning on the stud-shaft E' and driving the further intermediate gear E$^2$, turning on the stud-shaft E$^3$ and engaged with the eccentric gear E$^4$, secured to the shaft E$^5$, to which is also secured the gear-wheel E$^6$, which drives in turn the gear-wheel E$^7$, secured to the shaft E$^8$, E$^9$ and E$^{10}$ being the delivery-rolls, secured, respectively, to the shafts E$^5$ and E$^8$, these rolls being driven at varying speeds, for the purpose hereinafter explained, by reason of the eccentricity of the gear-wheel E$^4$ and having portions of their engaging faces cut away, as indicated at $e^9$ $e^{10}$, so that they act intermittently on the tubes lying between them.

F is a transverse bar or support extending across the frame of the machine and supporting studs F' F$^2$, upon which are pivoted the swinging arms F$^3$ F$^4$, having laterally-extending bars F$^5$ F$^6$, with cam-rolls secured at their ends, which are engaged in the peripheral grooves C$^6$ $c^6$ of the cam-rolls C$^4$ C$^5$. To the upper end of the arms F$^3$ and F$^4$ are secured the brackets F$^7$ F$^8$, which in turn support the longitudinally-extending bars F$^9$ and F$^{10}$, the function of which is to engage and operate the laterally-retractable devices forming part of the machine.

G is a shaft loosely journaled in the side frames A$^2$ of the machine and having attached to it the lever-arm G', from the end of which extends a cam-roller $g'$, engaged in the outer lateral cam-groove $c^7$ of the cam C$^5$, said cam-groove giving the shaft G an oscillatory movement.

G$^2$ represents swinging arms attached to the ends of the shaft G and supporting at their upper ends rectangular boxes G$^3$ G$^3$, to the upper and lower sides of which are secured the segmental racks shown at G$^4$ G$^5$, Figs. 1 and 4, G$^6$ G$^6$ indicating laterally-extending pins secured on the outer edges of the boxes.

H (see Figs. 8 and 9) is a sleeve turning freely on the shaft G and having connected with it a lever-arm H', supporting a cam-roll $h'$, engaged by the cam-groove C$^7$ on the outer face of the cam C$^4$ and by means of which an oscillatory movement is given to the sleeve H. Firmly attached to or formed with the sleeve H are the swinging arms H$^2$ H$^2$, which support at their upper ends the sleeves or hubs indicated at H$^3$ H$^3$.

I I are sleeved shafts supported in the hubs H$^3$, so as to both turn and move longitudinally therein, I' indicating collars secured to said shafts and engaged by the swinging bars F$^9$ F$^{10}$.

I$^2$ I$^2$ indicate distending-fingers secured on the inner ends of the hollow shafts I and adapted to operate in connection with the pivoted plate J', as will be described.

I$^3$ I$^3$ indicate segmental gears secured on the outer ends of shafts I and lying in engagement with the segmental rack G$^4$.

$i$ $i$ indicate hollow shafts turning freely in the hollow shafts I and moving longitudinally with said shafts I. To the inner ends of these shafts are secured the distending-fingers $i^2$ $i^2$, which operate in connection with the lower plate J', and to the outer ends of these shafts are secured the segmental gears $i^3$ $i^3$, which are engaged with the racks G$^5$.

J and $j$ are shafts journaled in the hollow shafts $i$, which are free to slide on them, the shaft J supporting at its inner end the lower distending plate or jaw, (indicated at J',) which jaw has at its outer end a collar J$^2$, by means of which it is supported and pivoted to turn on the shaft $j$. On the outer end of the shaft J is secured the disk J$^3$, having the projecting finger J$^4$ at its edge and the projecting pin J$^5$ from its outer side. The finger J$^4$ rests normally in contact with the pin G$^6$, as shown in Fig. 4, being held there with resilient pressure by the action of a spring J$^6$, attached to the pin J$^5$ and to a pin on the swinging arm G$^2$. The construction and attachments of the shaft $j$ are similar—that is to say, it has at its inner end the upper jaw or plate $j'$, which is also pivoted on the shaft J by means of a collar $j^2$. The only essential difference is that the fingers $j^4$ on the disk $j^3$ extend in the opposite direction to the finger J$^4$ on the disk J$^3$, and the pin $j^5$ is so placed and connected with the spring $j^6$ (see Fig. 3) that the action of the spring is to turn the plate $j^3$ in the opposite direction to that in which the spring tends to turn the plate J$^3$, the result being that the plates J' and $j'$ are normally held in the positions indicated in Figs. 20 and 24, and in moving apart, as shown in Figs. 21 and 22, they part in opposition to their respective springs.

$h$ indicates an annular groove-seat in the sleeve H, on which is pivotally supported the swinging arm K, $k$ indicating the removable part of the bearing. The arm K is formed with a longitudinal slot, as indicated at K', Fig. 7⁶, at the bottom of which is situated the pivot-pin $K^2$, and in which slot and turning on which pin is the lever-arm $K^3$, having a laterally-extending arm $K^4$, with a cam-roller $k^4$ projecting from its end and engaged with the inner lateral groove $c^8$ of the cam-drum $C^5$. The upper end of the lever $K^3$ is, as shown, formed with a tubular bearing $K^5$, through which, with its ends projecting on both sides, extends the rod indicated at $K^6$. To the lower end of the arm K is secured the projecting lever-arm $K^9$, having the cam-roller $k^9$ at its end, which is engaged by the cam-groove $c^8$ in cam-drum $C^4$, by means of which groove the arm K is oscillated.

$K^7$ is a projecting bracket secured to the end of the arm K and extending rearward to form the jaw indicated at $K^8$ and best shown in Figs. 20 to 24.

L is the pivot-pin, supported on the brackets $K^7$ and on which are supported, so as to both turn and slide freely, the sleeves L' L', having secured to them the collars indicated at $L^2$, the projecting lever-arms $L^3$, with laterally-extending jaws $L^4$, and also the projecting lever-arms $L^5$, which lie in the path of the swinging rod ends $K^6$ and are held against them by springs $L^6$. It will be noticed that the collars $L^2$ are engaged by the laterally-swinging bars $F^9$ $F^{10}$, by means of which the sleeves and attached portions are forced inward to engaging position or retracted at the proper time.

M is an intermediate gear-wheel engaged and driven by a gear-wheel $D^7$ on the shaft $D^2$ and engaging and driving the gear-wheel M', secured to the shaft of the lower paste-roll $M^4$, to which shaft is also secured the gear-wheel $M^2$, engaging the gear-wheel $M^3$, which in turn is secured to the shaft of the upper paste-wheel $M^5$.

$M^6$ is a paste-bar secured on the periphery of the paste-drum $M^4$, as best shown in Fig. 5.

N is a paste-box supported by downwardly-extending arms N' on the hub of gear $E^7$ and shaft $E^8$ and by a forwardly-extending arm $N^2$, resting on the hub of gear $D^4$ on shaft $D^2$.

$N^3$ is a bar at the front end of the paste-box which lies close to the periphery of the paste-drum $M^5$ and regulates the thickness of the paste layer on the face of said drum.

$N^4$ is a bar extending across the upper part of the box and also lying close to the drum $M^5$. It will be evident that, as shown in Fig. 5, the paste-bar $M^6$ on the drum $M^4$ will come in contact with the drum $M^5$ once in each revolution, picking up a layer of paste, which it subsequently deposits on the lip of the bag-blank.

O is a bracket secured on the front of the machine and serving to support a shaft O', to one end of which is attached the revolving striker $O^2$, while to the other end is attached the worm-wheel $O^3$, driven by another worm-wheel $O^4$, attached to the shaft $D^3$.

P and P' indicate the upper and lower knives, by means of which, in connection with the striker $O^2$, the tube is severed into blanks having the under folds projecting beyond the severed edges of the upper folds.

In operation a tucked paper tube is fed to the feed-rolls D' D' either from a former, as indicated at $B^2$, or in any other way, the tube passing from the feed-rolls with its top ply overlying the knife P and its bottom ply overlying the knife P' and being fed forward between the jaws $K^8$ and $L^4$ and between the plates J' and $j'$ into the grip of the delivery-rolls $E^{10}$ $E^9$, the various parts of the machine being in the position substantially as indicated at Fig. 5 at the time that the striker $O^2$ comes into operation to sever the tube into a bag-blank, prior to which severing operation the arms $F^3$ $F^4$ are, as shown, (though this not essential,) in their outer positions, the plates $F^9$ and $F^{10}$ holding the jaws $L^4$ and the distending-fingers $I^2$ $i^2$ in their outer or retracted positions. After the blank is severed it is drawn forward by the delivery-rolls until it assumes the position indicated in Fig. 20, the rotating paste-drum $M^4$ bringing the paste-bar $M^6$ in contact with the lips and applying paste thereto, the eccentricity of the gear-wheel $E^4$ being of such a character that after the blank is severed from the tube the delivery-rolls move for a short time at greater speed than the feed-rolls, drawing the blank in from the end of the following tube. After having assumed the position shown in Fig. 20 the blank comes to a standstill, owing to the delivery-rolls releasing their grip upon it, and at or slightly before this period the arms $F^3$ $F^4$, with their bars $F^9$ and $F^{10}$, move inward, causing the jaws $L^4$ to extend over the end of the blank and the distending-fingers $I^2$ $i^2$ to move inward into the side tucks of the blank. Then the cam-groove $c^8$, acting on the lever-arm $K^4$, moves the lever-arm K backward, and this backward movement, which of course is shared by the pins $K^6$, permits the spring $L^6$ to draw the lever-arm $L^5$ backward, rotating the sleeves L' on the shafts L and moving the arms $L^3$, with their gripping-jaws $L^4$, downward until they clamp the end of the blank slightly in the rear of the lips against the jaw $K^8$, as shown in Fig. 21. Immediately after the clamping of the end of the blank the cam-groove $c^8$, acting on the lever-arm $K^9$, moves the arm K backward, so that the engaged jaws $L^4$ and $K^8$ are moved toward the plates J' $j'$; but synchronously with the forward movement of the clamping-jaws the rack-carrying boxes $G^3$ are moved forward by the action of the cam-groove $c^7$, acting through the lever-arm G' on the shaft G and through the shaft G on the arms $G^2 G^2$. The racks in turn acting on the segments $I^3 i^3$ rotate the shafts I $i$ in opposite directions, causing distending-fingers $I^2$ to move upward against the plate $j'$ and the distending-fingers $i^2$ to move downward against the plate J', the said plates J' and $j'$ being retained in position, as shown in Fig. 20, by the resilient action of the springs $J^6 j^6$ until moved by the distending-fingers spreading the blank open into rectangular form, as shown in Figs. 21 and 22, while the advancing jaws $L^4 K^8$ press forward, carrying the end of the blank with them and forming the bottom of the square bag, except that the extreme edges of the blank project rearwardly and are not folded up against the bottom, as they are in the completed bag. The bag-bottom having been brought to shape, as shown in Fig. 22, the forward end of the blank is again engaged by the delivery-rolls $E^{10} E^9$; but as the blank moves forward the distending plates and fingers and the clamping-jaws $L^4 K^8$ move forward with it, the clamping-jaws being still carried forward by the action of the cam $C^8$ and the distending devices being carried forward through the action of the cam-groove $C^7$ acting on the lever H' and through the sleeve H on the arms $H^2$, which support and carry the hubs or sleeves $H^3 H^3$. As the hubs and the parts supported by them move forward the gear-segments $I^3 i^3$ are rotated in the opposite direction to that in which they were moved by the forward movement of the rack-box $G^3$, so that they move backward, as indicated in Fig. 23, folding the bottom of the bag over upon itself along a central line, which being accomplished the cams $C^6 c^6$, acting on the arms $F^3 F^4$ and bars $F^9 F^{10}$, draw the distending-fingers outward, so that they release their hold on the blank and at the same time draw the jaws $L^4$ outward, so that they also release the blank, which is then drawn forward by and between the delivery-rolls and the opposite lips pressed against and pasted to the adjacent portion of the bag-bottom. The bag being completed and the distending devices withdrawn, as described, the cams are so shaped as to move the described parts back to their original positions, as described, where the following blank is engaged in the same way and carried forward to completion.

Having now described my invention, what I claim as new, and desire to secure by Letters Patent, is—

1. In a paper-bag machine, the combination of the pivoted plates J' $j'$ with the concentrically-pivoted and longitudinally-movable fingers $I^2 I^2 i^2 i^2$ operating to distend the end of a bellows-folded bag-blank as described, and mechanism for folding the distended end into a bag-bottom against said plates J' $j'$.

2. In a paper-bag machine, the combination of the pivoted plates J' $j'$ having a space between them into which a bellows-folded bag-blank is fed with concentrically-pivoted longitudinally-movable fingers $I^2 I^2 i^2 i^2$ arranged when thrust inward to engage the corners of the blank and clamp them against plates J'$j'$, means for rotating the fingers and plates outwardly on their concentric pivots to distend the end of the blank, and for rotating them inward to fold the bag-bottom when formed over on itself, and means for forming the distended end of the bag into a bag-bottom while the plates and fingers are in the outward position.

3. In a paper-bag machine, the combination of the pivoted plates J' $j'$ having a space between them into which a bellows-folded bag-blank is fed with concentrically-pivoted longitudinally-movable fingers $I^2 I^2 i^2 i^2$ arranged when thrust inward to engage the corners of the blank and clamp them against plates J'$j'$, means for rotating the fingers and plates outwardly on their concentric pivots to distend the end of the blank, a pair of laterally-movable clamping-jaws, as $K^8 L^4$, operating to clamp the edges of the blank together and carry said clamped edges toward the plates J' $j'$ as they open so as to form the distended blank end into a bag-bottom and means for retracting the fingers and withdrawing the folded blank.

4. In a paper-bag machine, the combination of the pivoted plates J' $j'$ having a space between them into which a bellows-folded bag-blank is fed with concentrically-pivoted longitudinally-movable fingers $I^2 I^2 i^2 i^2$ arranged when thrust inward to engage the corners of the blank and clamp them against plates J'$j'$, means for rotating the fingers and plates outwardly on their concentric pivots to distend the end of the blank, and for rotating them inward to fold the bag-bottom when formed over on itself, a pair of laterally-movable clamping-jaws, as $K^8 L^4$, operating to clamp the edges of the blank together and carry said clamped edges toward the plates J' $j'$ as they open so as to form the distended blank end into a bag-bottom and means for retracting the fingers and withdrawing the folded blank.

5. In a paper-bag machine, the combination of the pivoted plates J' $j'$ having a space between them into which a bellows-folded bag-blank is fed with concentrically-pivoted longitudinally-movable fingers $I^2 I^2 i^2 i^2$ arranged when thrust inward to engage the corners of the blank and clamp them against plates J'$j'$, means for rotating the fingers and plates outwardly on their concentric pivots to distend the end of the blank and for rotating them inward to fold the bag-bottom when formed over on itself, means for applying paste to the edges of the blank, a pair of laterally-movable clamping-jaws, as $K^8 L^4$, operating to clamp the edges of the blank together and carry said clamped edges toward the plates J' $j'$ as they open so as to form the distended blank end into a bag-bottom, and means for retracting the fingers and withdrawing the folded blank.

6. In a paper-bag machine, the combination of the swinging pivoted plates $J'$ $j'$ having a space between them into which a bellows-folded bag-blank is fed with concentrically-pivoted longitudinally-movable fingers $I^2$ $I^2$ $i^2$ $i^2$ swinging with the plates arranged when thrust inward to engage the corners of the blank and clamp them against plates $J'$ $j'$, means for rotating the fingers and plates outwardly on their concentric pivots to distend the end of the blank, and for rotating them inward to fold the bag-bottom when formed over on itself, means for swinging the plates and fingers forward during the formation of the bag-bottom and backward after it is complete.

7. In a paper-bag machine the combination of the feed-rolls, as D D', with delivery-rolls arranged to act intermittently on the blanks, means for moving said delivery-rolls with varying speed as described, a blank-cutter arranged to sever a tube into blanks as it issues from the feed-rolls and while engaged by the delivery-rolls, a pair of swinging pivoted plates $J'$ $j'$ having an opening between them through which the blanks pass, concentrically-pivoted longitudinally-movable fingers $I^2$ $I^2$ $i^2$ $i^2$ arranged to enter between the plates and grip the corners of the blanks against them, means for rotating the plates and fingers on their pivots to distend the end of the tube, laterally-movable clamping-jaws arranged to grip the end of the blank and move it toward the opening plates $J'$ $j'$ so as to form the bag-bottom, means for swinging the plates and fingers toward the delivery-rolls as the bag-bottom is brought to shape and for simultaneously rotating the plates and fingers backward on their pivots to fold the bag-bottom on itself and means for retracting said fingers and returning them with the plates and jaws to position to engage a fresh blank.

8. In a paper-bag machine clamping-jaws, as $K^8$ $L^4$, arranged to clamp together the ends of a bellows-folded bag-blank, means for distending the blank operating to spread it out into rectangular form on the plane where the bottom is to be formed, and means for moving said clamping-jaws toward said distending devices as the distention proceeds so as to form the bottom.

9. In a paper-bag machine, the combination of the swinging arms $H^2$ having the bearings $H^3$ at their ends with the concentrically-centered swinging arms $G^2$ having the racks $G^4$ $G^5$ supported on their ends, the concentrically-centered swinging arm K having clamping-jaws supported on its end and adapted to seize and clamp the end of a bag-blank, the swinging arms $F^4$ moving on pivots at right angles to the pivots of the above-mentioned arms, the clamping plates and fingers $J'$ $j'$ and $I^2$ $I^2$ $i^2$ $i^2$ concentrically pivoted in bearings $H^3$ and said fingers longitudinally movable in said bearings and actuated by arms $F^4$ and racks $G^4$ $G^5$ as described and means for moving said swinging arms in sequence as specified.

GEORGE R. WARD.

Witnesses:
GEORGE A. LESSEY,
GEO. A. PATTERSON.